(12) United States Patent
Yao et al.

(10) Patent No.: US 8,982,294 B2
(45) Date of Patent: Mar. 17, 2015

(54) LIQUID CRYSTAL DISPLAY PANEL

(75) Inventors: Xiaohui Yao, Shenzhen (CN); Je-Hao Hsu, Shenzhen (CN)

(73) Assignee: Shenzhen China Star Optoelectronics Technology co., Ltd., Shenzhen, Guangdong (CN)

( * ) Notice: Subject to any disclaimer, the term of this patent is extended or adjusted under 35 U.S.C. 154(b) by 379 days.

(21) Appl. No.: 13/583,220

(22) PCT Filed: Jul. 18, 2012

(86) PCT No.: PCT/CN2012/078800
§ 371 (c)(1),
(2), (4) Date: Sep. 7, 2012

(87) PCT Pub. No.: WO2014/012224
PCT Pub. Date: Jan. 23, 2014

(65) Prior Publication Data
US 2014/0015740 A1    Jan. 16, 2014

(51) Int. Cl.
*G02F 1/1343* (2006.01)
*G02F 1/133* (2006.01)
*G09G 3/36* (2006.01)

(52) U.S. Cl.
CPC . *G09G 3/36* (2013.01); *G02F 1/133* (2013.01)
USPC .......................................................... 349/39

(58) Field of Classification Search
USPC .......................................................... 349/39
See application file for complete search history.

(56) References Cited

U.S. PATENT DOCUMENTS

| | | | |
|---|---|---|---|
| 8,179,344 B2 * | 5/2012 | Hsieh et al. ................. | 345/87 |
| RE44,573 E * | 11/2013 | Hsieh et al. ................. | 349/43 |
| 2006/0146215 A1 * | 7/2006 | Huang et al. ................. | 349/43 |
| 2008/0024706 A1 * | 1/2008 | Yang et al. ................... | 349/129 |
| 2008/0129669 A1 * | 6/2008 | Kim ............................. | 345/88 |
| 2009/0195720 A1 * | 8/2009 | Chou et al. ................... | 349/39 |
| 2009/0310076 A1 * | 12/2009 | Hsieh et al. .................. | 349/144 |
| 2011/0242073 A1 * | 10/2011 | Horiuchi et al. ............. | 345/204 |
| 2012/0182513 A1 * | 7/2012 | Kim et al. .................... | 349/143 |
| 2012/0326950 A1 * | 12/2012 | Park et al. .................... | 345/55 |
| 2013/0010248 A1 * | 1/2013 | Kang ............................ | 349/139 |
| 2013/0032827 A1 * | 2/2013 | Moon et al. .................. | 257/88 |
| 2013/0033668 A1 * | 2/2013 | Yao et al. ..................... | 349/143 |
| 2013/0057813 A1 * | 3/2013 | Jeong et al. .................. | 349/110 |
| 2013/0141684 A1 * | 6/2013 | Xu ................................ | 349/139 |
| 2013/0235317 A1 * | 9/2013 | Yao et al. ..................... | 349/141 |
| 2013/0271713 A1 * | 10/2013 | Miyake et al. ............... | 349/124 |
| 2013/0299741 A1 * | 11/2013 | Zhong ......................... | 252/299.5 |
| 2013/0321748 A1 * | 12/2013 | Kang ............................ | 349/103 |
| 2014/0002782 A1 * | 1/2014 | Nakanishi et al. ........... | 349/123 |

* cited by examiner

*Primary Examiner* — Timothy L Rude

(74) *Attorney, Agent, or Firm* — Andrew C. Cheng

(57) ABSTRACT

The present invention provides a liquid crystal display panel containing an array substrate and a color filter substrate opposing the array substrate. The array substrate has a first pixel electrode and a storage electrode with the storage electrode configured below the first pixel electrode. The color filter substrate has a second pixel electrode. The first and second pixel electrodes cross each other laterally; and at least one of the first and second pixel electrodes has a number of ITO slits of unequal lengths at a location corresponding to an edge of the storage electrode. By configuring ITO slits of different lengths on the pixel electrodes corresponding to the edge of storage electrode can enhance the electric field pattern, effectively overcome the interference from lateral electric field, and avoid the abnormal display, resulted from the abnormal metal taper, thereby achieving enhanced display quality.

14 Claims, 8 Drawing Sheets

LIQUID CRYSTAL DISPLAY PANEL

BACKGROUND OF THE INVENTION

1. Field of the Invention

The present invention relates to the field of liquid crystal displaying techniques, and in particular to a liquid crystal display panel,

2. The Related Arts

PVA (Patterned Vertical Alignment), as a VA (vertical Alignment) technique for liquid crystal display (LCD) panel, controls the orientation of liquid crystal molecules by the electric field formed by the pixel electrode patterns on the array substrate and the color filter substrate.

Currently, a PVA pixel structure maintains its voltage level through the storage electrode configured on the array substrate. The storage electrode generally contains a top one and a bottom one. As shown in FIG. 1, ordinarily metal taper at the edges of the storage electrodes is gentle so as to avoid abnormal display from the LCD panel. However, during the production process, the metal taper at the edges of the storage electrodes become steep due to the inaccuracy of the etching process, as shown in FIG. 2. In this case, the lateral electric field from the storage electrodes would be too strong, causing the liquid crystal molecules around the storage electrodes to align abnormally, thereby leading to disclination to the display of pixels, and affecting the display quality of the LCD panel.

As such, a LCD panel obviating the above problem is required.

SUMMARY OF THE INVENTION

The technical issue to be addressed by the present invention is to provide a liquid crystal display panel capable of avoiding the problem of abnormal display resulted from the abnormal metal taper of the storage electrode.

To address the technical issue, the present invention provides a liquid crystal display panel containing an array substrate and a color filter substrate opposing the array substrate. The array substrate has a first pixel electrode and a storage electrode with the storage electrode configured below the first pixel electrode. The color filter substrate has a second pixel electrode. The first and second pixel electrodes cross each other laterally; and at least one of the first and second pixel electrodes has a number of ITO slits of unequal lengths at a location corresponding to an edge of the storage electrode. The first and second pixel electrodes are ">>" shaped electrodes; and the ITO slits are at the tip of the ">>" shape.

In an alternative embodiment, the storage electrode contains a top storage electrode and a bottom storage electrode. The top storage electrode is above the bottom storage electrode; and the first pixel electrode is above the top storage electrode.

In an alternative embodiment, the ITO slits are configured at a location corresponding to an edge of the top storage electrode.

In an alternative embodiment, the ITO slits are configured at a location corresponding to an edge of the bottom storage electrode.

To address the technical issue, the present invention provides a liquid crystal display panel containing an array substrate and a color filter substrate opposing the array substrate. The array substrate has a first pixel electrode and a storage electrode with the storage electrode configured below the first pixel electrode. The color filter substrate has a second pixel electrode. The first and second pixel electrodes cross each other laterally; and at least one of the first and second pixel electrodes has a number of ITO slits of unequal lengths at a location corresponding to an edge of the storage electrode.

In an alternative embodiment, the ITO slits are configured on the first pixel electrode at a location corresponding to an edge of the storage electrode.

In alternative embodiment, the first pixel electrode is a ">>" shaped electrodes; and the ITO slits are at the tip of the ">>" shape.

In an alternative embodiment, the first pixel electrode is a "<<" shaped electrodes; and the ITO slits are at the tip of the "<<" shape.

In an alternative embodiment, the ITO slits are configured on the second pixel electrode at a location corresponding to an edge of the storage electrode.

In an alternative embodiment, the second pixel electrode is a shaped electrode; and the ITO slits are at the tip of the ">>" shape.

In an alternative embodiment, the second pixel electrode is a ">>" shaped electrode; and the ITO slits are at the tip of the "<<" shape.

In an alternative embodiment, the storage electrode contains a top storage electrode and a bottom storage electrode. The top storage electrode is above the bottom storage electrode; and the first pixel electrode is above the top storage electrode.

In an alternative embodiment, the ITO slits are configured at a location corresponding to an edge of the top storage electrode.

In an alternative embodiment, ITO slits are configured at a location corresponding to an edge of the bottom storage electrode.

The advantage of the present invention is as follows. By configuring ITO slits of different lengths on the pixel electrodes corresponding to the edge of storage electrode can enhance the electric field pattern, effectively overcome the interference from lateral electric field, and avoid the abnormal display, resulted from the abnormal metal taper, thereby achieving enhanced display quality.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
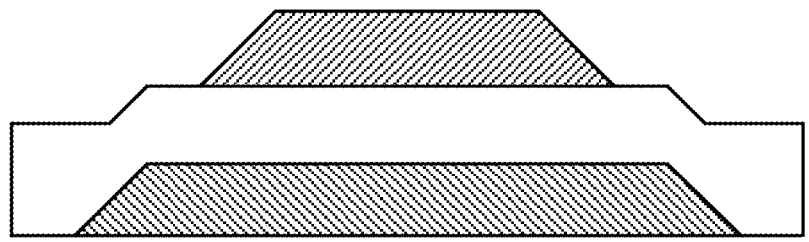
FIG. 1 is a schematic diagram showing the structure of a storage electrode with normal metal taper.
Figure 2:
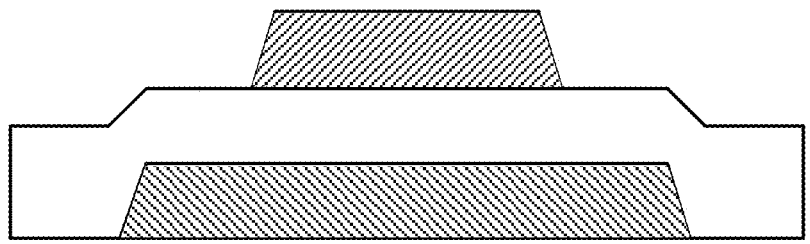
FIG. 2 is a schematic diagram showing the structure of a storage electrode with abnormal metal taper.
Figure 3:
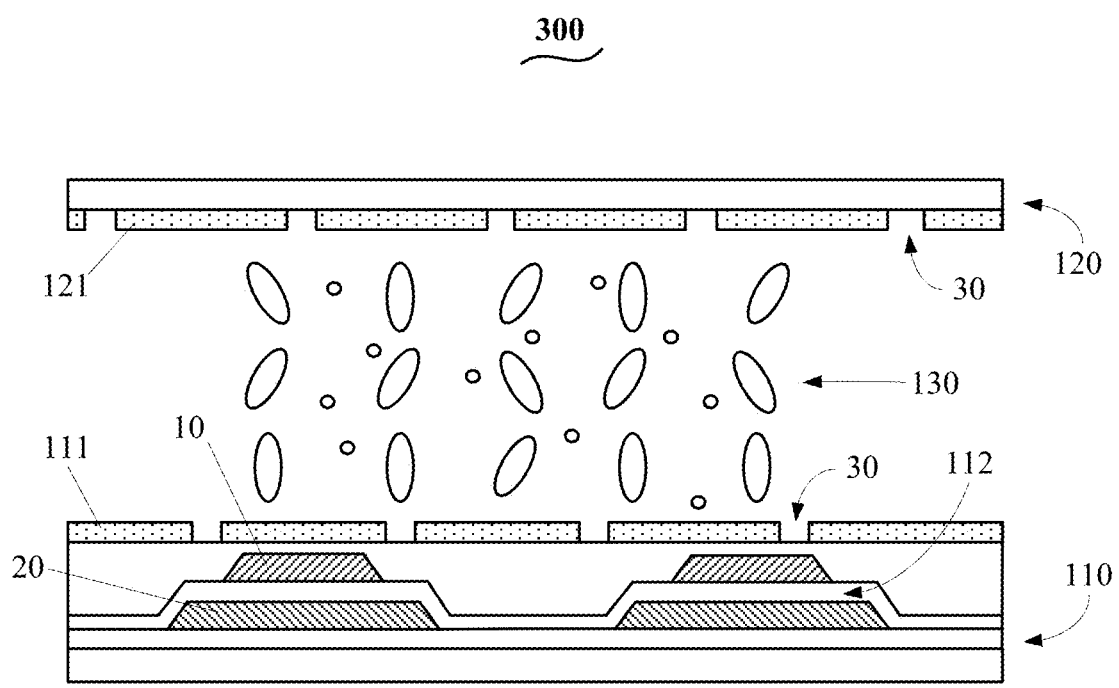
FIG. 3 is a sectional diagram showing a LCD panel according to the present invention.

FIG. 3 is a sectional diagram showing a LCD panel 300 according to the present invention. As illustrated, the LCD panel 300 is PVA panel, and contains an array substrate 110, a color filer substrate 120, and a liquid crystal layer 130.

The array substrate 110 and the color filter substrate 120 oppose each other. On the array substrate 110, a first pixel electrode 111 and a storage electrode 112 are configured. On the color filter substrate 120, a second pixel electrode 121 is configured. The first pixel electrode 111 is configured above the storage electrode 112. The storage electrode 112 contains a top storage electrode 10 and a bottom storage electrode 20. The top storage electrode 10 is below the first pixel electrode 111, and above the bottom storage electrode 20. The area of the top storage electrode 10 is usually slightly smaller than that of the bottom storage electrode 20.

It should be noted that the first and second pixel electrodes 111 and 121 are not complete ITO films. Instead, there are a number of slits, namely the ITO slits 30. The second and first pixel electrodes 121 and 111 cross each other laterally. Then, the orientation of the liquid crystal molecules in the liquid crystal layer 130 is controlled by applying electric field between the first and second pixel electrodes 111 and 121.

Figure 4:
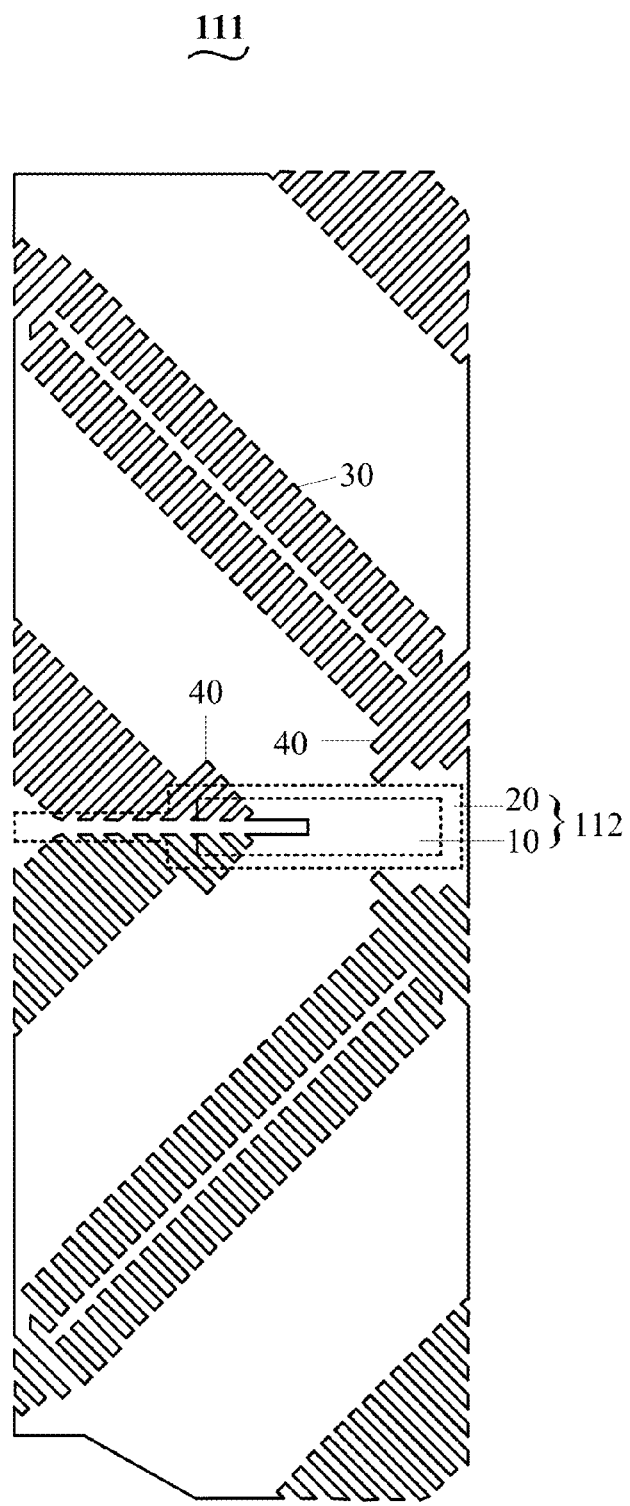
FIG. 4 is a schematic diagram showing the structure of the LCD panel's first pixel electrode according to a first embodiment of the present invention.

FIG. 4 is a schematic diagram showing the structure of the LCD panel 300's first pixel electrode 111 according to a first embodiment of the present invention. As illustrated, the first pixel electrode 111 is a ">>"-shaped electrode. At the tip of the ">>" shape of the first pixel electrode 111 (i.e., a location corresponding to an edge of the storage electrode 112), a number of ITO slits 40 of unequal lengths are configured.

The width of the ITO slits 40 is identical to that of the ITO slits 30 originally on the first pixel electrode 111. The length difference between adjacent ITO slits 40 is between 1 um to 10 um, 1 um to 15 um, or other ranges appropriate for a PVA panel.

In the present embodiment, the second pixel electrode 121 is also a ">>"-shaped electrode. The pattern of the second pixel electrode 121 can also adopt patterns appropriate for a PVA panel. The details are omitted here.

After the array substrate 110 and the color filter substrate 120 are matched, the ITO slits 40 of different lengths can alter the distribution of electric field around the corresponding location of the storage electrode 112, enhancing its field pattern and overcoming the interference from lateral electric field. The orientation of the liquid crystal molecules around the corresponding location of the storage electrode 112 is as such aligned with the orientation of the liquid crystal molecules in other locations, thereby avoiding the abnormal display resulted from the abnormal metal taper.

Figure 5:
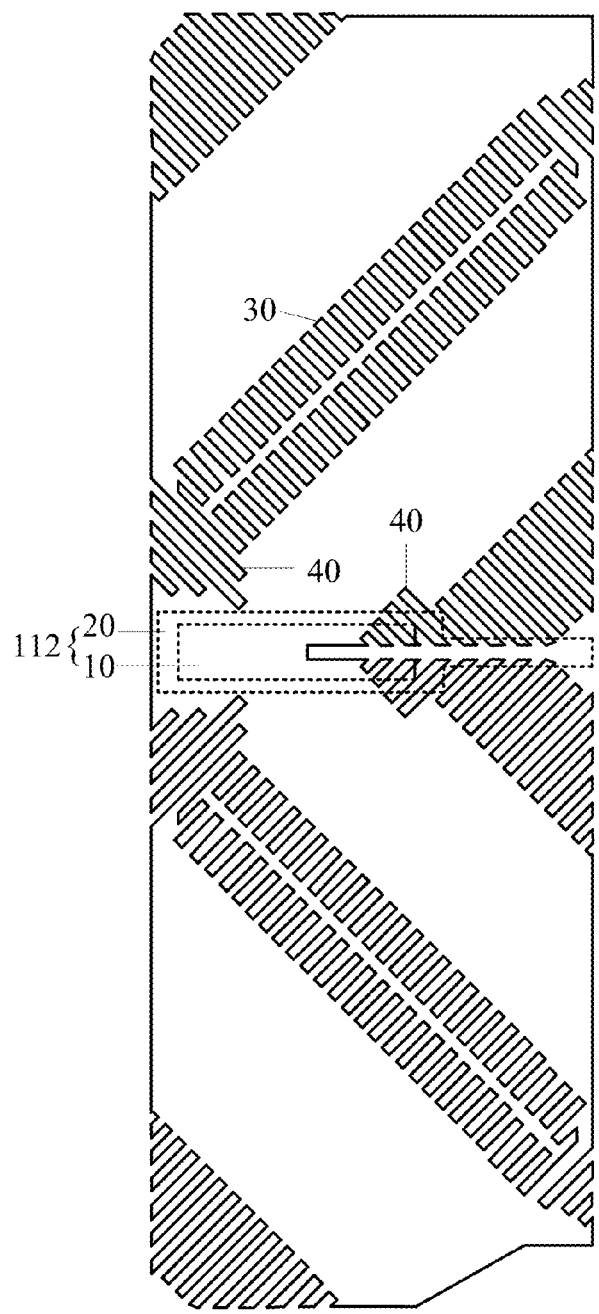
FIG. 5 is a schematic diagram showing the structure of the LCD panel's first pixel electrode according to a second embodiment of the present invention.

FIG. 5 is a schematic diagram showing the structure of the LCD panel 300's first pixel electrode 211 according to a second embodiment of the present invention.

In the present embodiment, the first pixel electrode 211 is a "<<"-shaped electrode as shown in FIG. 5. At the tip of the "<<" shape of the first pixel electrode 211 (i.e., a location corresponding to an edge of the top and bottom storage electrodes 10 and 20 of the storage electrode 112), a number of ITO slits 40 of unequal lengths are configured.

The "<<"-shaped first pixel electrode 211 is structurally reversed from the ">>"-shaped first pixel electrode 111 of the previous embodiment. However, the working principle and effect are identical and the details are omitted here.

In the present embodiment, the second pixel electrode 121 is also a "<<"-shaped electrode. The pattern of the second pixel electrode 121 can also adopt various "<<" patterns appropriate for a PVA panel. The details are omitted here.

Figure 6:
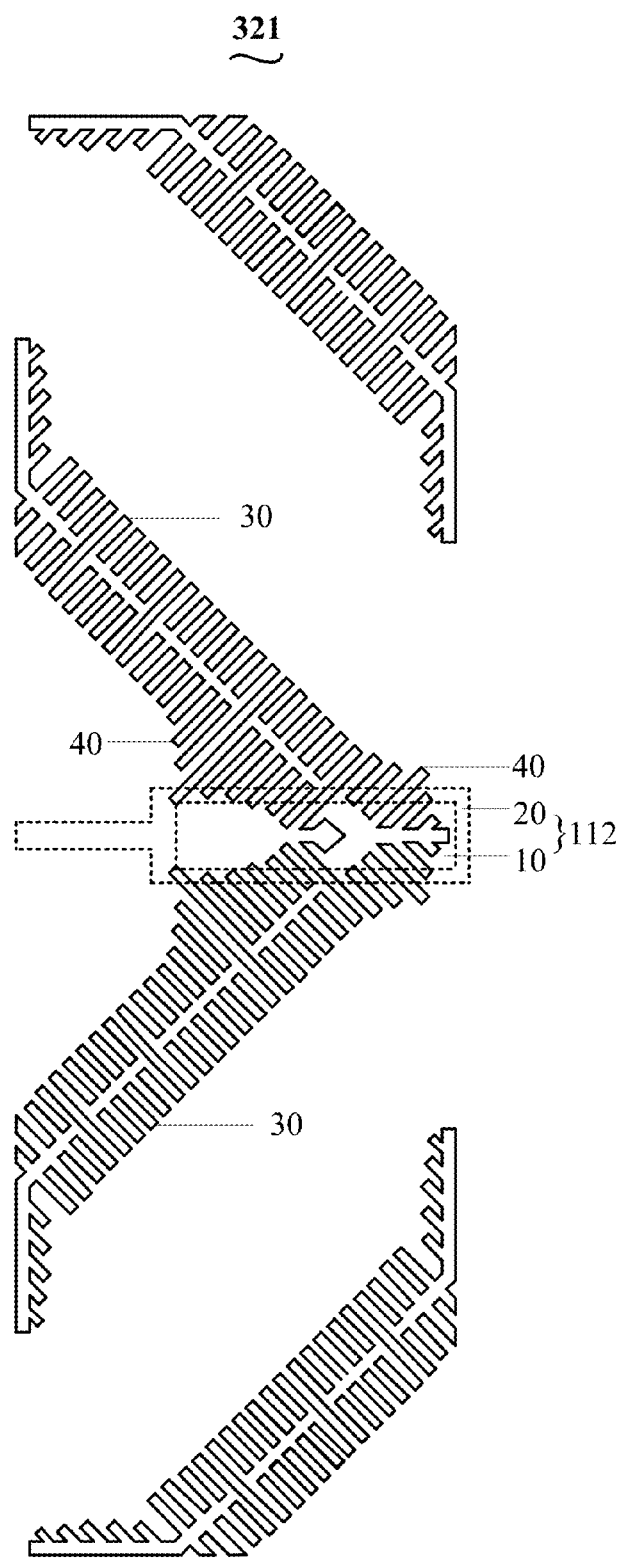
FIG. 6 is a schematic diagram showing the structure of the LCD panel's second pixel electrode according to a third embodiment of the present invention.

FIG. 6 is a schematic diagram showing the structure of the LCD panel 300's second pixel electrode 321 according to a third embodiment of the present invention. As illustrated, the second pixel electrode 321 is a ">>"-shaped electrode. At the tip of the ">>" shape of the second pixel electrode 321 (i.e., a location corresponding to an edge of the storage electrode 112), a number of ITO slits 40 of unequal lengths are configured.

In the present embodiment, the first pixel electrode 111 is also a ">>"-shaped electrode. The pattern of the first pixel electrode 111 can also adopt patterns appropriate for a PVA panel. The details are omitted here.

After the array substrate 110 and the color filter substrate 120 are matched, the ITO slits 40 of different lengths can alter the distribution of electric field around the corresponding location of the storage electrode 112, enhancing its field pattern and overcoming the interference from lateral electric field. The orientation of the liquid crystal molecules around the corresponding location of the storage electrode 112 is as such aligned with the orientation of the liquid crystal molecules in other locations, thereby avoiding the abnormal display resulted from the abnormal metal taper.

Figure 7:
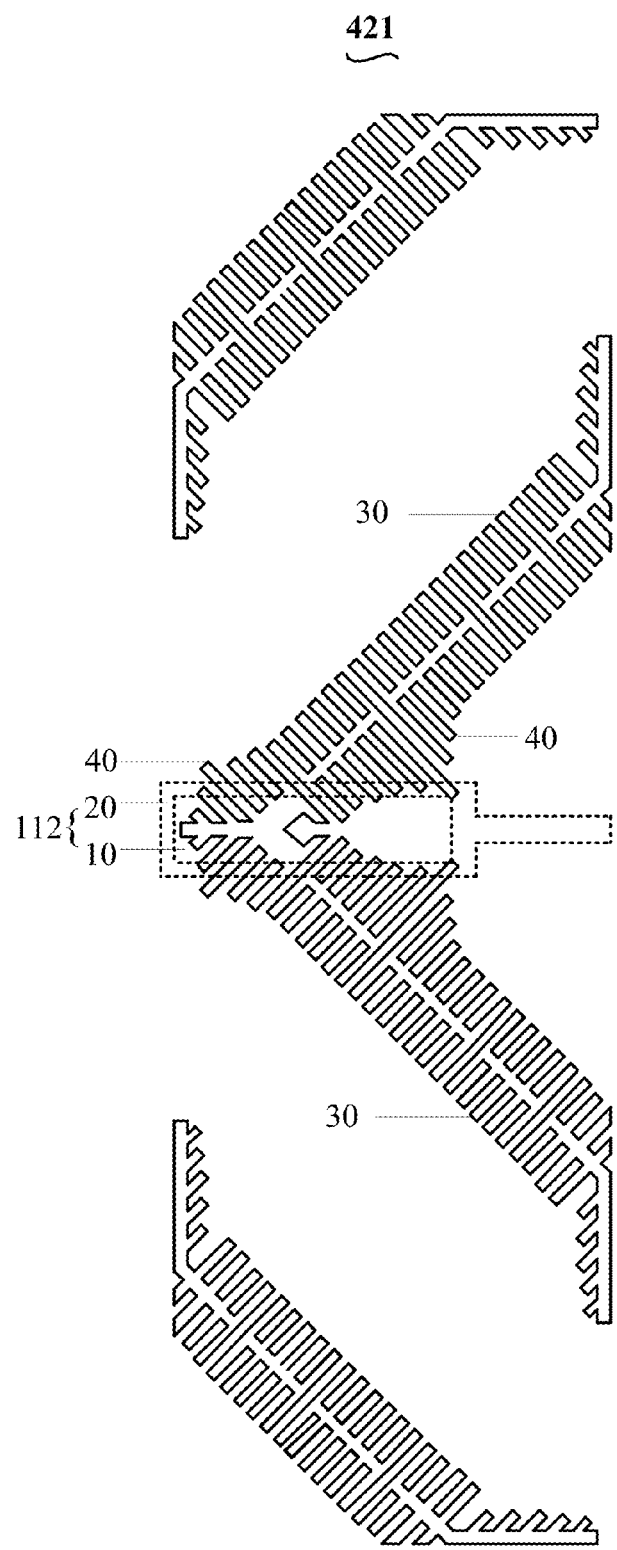
FIG. 7 is a schematic diagram showing the structure of the LCD panel's second pixel electrode according to a fourth embodiment of the present invention.

FIG. 7 is a schematic diagram showing the structure of the LCD panel 300's second pixel electrode 421 according to a fourth embodiment of the present invention.

In the present embodiment, the second pixel electrode 421 is a "<<"-shaped electrode as shown in FIG. 7. At the tip of the "<<" shape of the second pixel electrode 421 (i.e., a location corresponding to an edge of the top and bottom storage electrodes 10 and 20 of the storage electrode 112), a number of ITO slits 40 of unequal lengths are configured.

The "<<"-shaped second pixel electrode 421 is structurally reversed from the ">>"-shaped second pixel electrode 321 of the previous embodiment. However, the working principle and effect are identical and the details are omitted here.

In the present embodiment, the first pixel electrode 111 is also a "<<"-shaped electrode. The pattern of the first pixel electrode 111 can also adopt various "<<" patterns appropriate for a PVA panel. The details are omitted here.

It should be understood that the present invention has alternative embodiments as follows.

In an alternative embodiment, the first pixel electrode 111 is a ">>"-shaped electrode as shown in FIG. 4 whereas the second pixel electrode 121 is a ">>"-shaped electrode as shown in FIG. 6. Additionally, the present embodiment has the ITO slits 40 of the first and second pixel electrodes cross each other laterally.

In another alternative embodiment, the first pixel electrode 111 is a "<<"-shaped electrode as shown in FIG. 5 whereas the second pixel electrode 121 is a "<<"-shaped electrode as shown in FIG. 7. Additionally, the present embodiment has the ITO slits 40 of the first and second pixel electrodes cross each other laterally.

In the above two embodiments, after the array substrate 110 and the color filter substrate 120 are matched, the ITO slits 40 of different lengths on the first and second pixel electrodes 111 and 121 can alter the distribution of electric field around the corresponding location of the storage electrode 112, enhancing its field pattern and overcoming the interference from lateral electric field. The orientation of the liquid crystal molecules around the corresponding location of the storage electrode 112 is as such aligned with the orientation of the liquid crystal molecules in other locations, thereby avoiding the abnormal display resulted from the abnormal metal taper.

Figure 8:
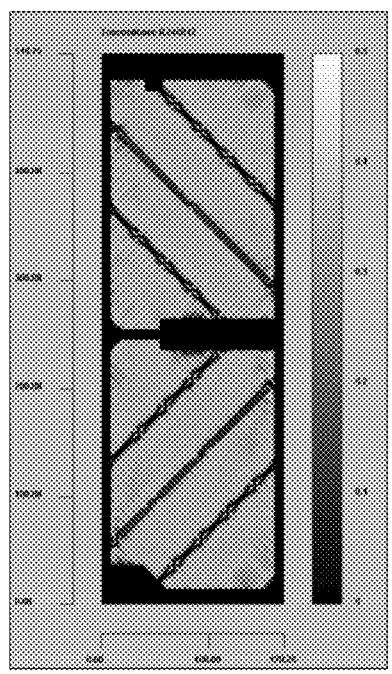
FIG. 8 is a diagram showing the output simulation of a LCD panel according to the first and second embodiment of the present invention.
Figure 9:
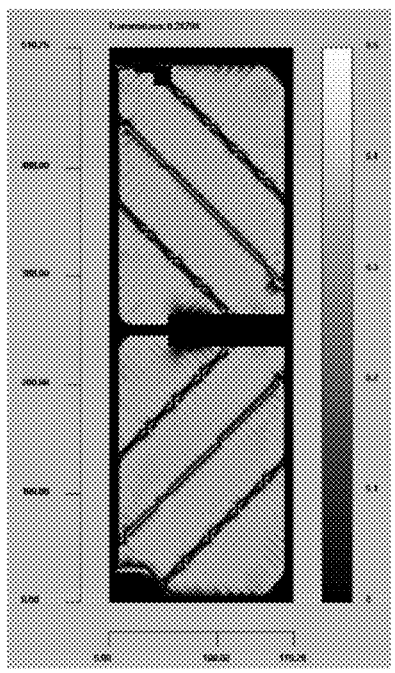
FIG. 9 is a diagram showing the output simulation of a LCD panel according to the third and fourth embodiment of the present invention.
Figure 10:
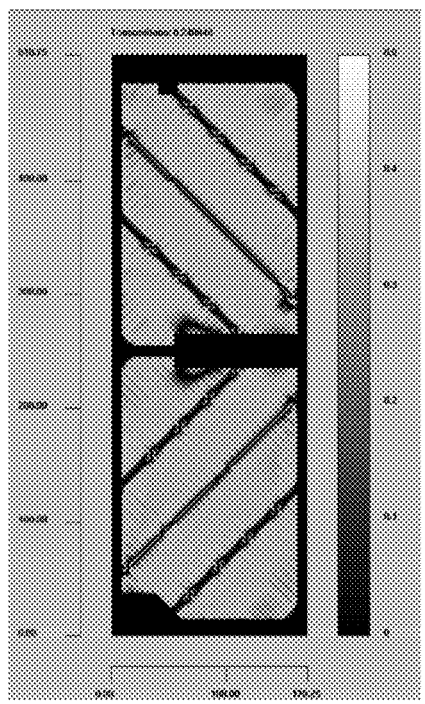
FIG. 10 is a diagram showing the output simulation of a conventional LCD panel.

FIG. 8 is a diagram showing the output simulation of a LCD panel according to the first and second embodiment of the present invention. FIG. 9 is a diagram showing the output simulation of a LCD panel according to the third and fourth embodiment of the present invention. FIG. 10 is a diagram showing the output simulation of a conventional LCD panel.

Comparing FIG. 8 against FIG. 10, the dark stripes around the edge of the storage electrode 112 (i.e., the black rectangle in the drawings) are obviously lessened, meaning that the display displacement caused by the abnormal metal taper of the storage electrode is reduced, and that the transmittance and display quality of the LCD panel are significantly enhanced.

Comparing FIG. 9 against FIG. 10, the dark stripes around the edge of the storage electrode 112 (i.e., the black rectangle in the drawings) are obviously lessened, meaning that the display displacement caused by the abnormal metal taper of the storage electrode is reduced, and that the transmittance and display quality of the LCD panel are significantly enhanced. To summarize, by configuring ITO slits of different lengths on the pixel electrodes corresponding to the edge of storage electrode can enhance the electric field pattern, effectively overcome the interference from lateral electric field, and avoid the abnormal display, resulted from the abnormal metal taper, thereby achieving enhanced display quality.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A liquid crystal display panel, comprising:
   an array substrate having a first pixel electrode and a storage electrode, the storage electrode configured below the first pixel electrode; and
   a color filter substrate opposing the array substrate, and having a second pixel electrode;
   wherein the first and second pixel electrodes cross each other laterally; at least one of the first and second pixel electrodes has a plurality of ITO slits of unequal lengths at a location corresponding to an edge of the storage electrode; the first and second pixel electrodes are ">>" shaped electrodes; and the ITO slits are at the tip of the ">>" shape.

2. The liquid crystal display panel as claimed in claim 1, wherein the storage electrode comprises a top storage electrode and a bottom storage electrode; the top storage electrode is above the bottom storage electrode; and the first pixel electrode is above the top storage electrode.

3. The liquid crystal display panel as claimed in claim 2, wherein the ITO slits are configured at a location corresponding to an edge of the top storage electrode.

4. The liquid crystal display panel as claimed in claim 2, wherein the ITO slits are configured at a location corresponding to an edge of the bottom storage electrode.

5. A liquid crystal display panel, comprising:
   an array substrate having a first pixel electrode and a storage electrode, the storage electrode configured below the first pixel electrode; and
   a color filter substrate opposing the array substrate, and having a second pixel electrode;
   wherein the first and second pixel electrodes cross each other laterally; and at least one of the first and second pixel electrodes has a plurality of ITO slits of unequal lengths at a location corresponding to an edge of the storage electrode.

6. A liquid crystal display panel as claimed in claim 5, wherein the ITO slits are configured on the first pixel electrode at a location corresponding to an edge of the storage electrode.

7. The liquid crystal display panel as claimed in claim 6, wherein the first pixel electrode is a ">>" shaped electrode; and the ITO slits are at the tip of the ">>" shape.

8. A liquid crystal display panel as claimed in claim 6, wherein the first pixel electrode is a "<<" shaped electrode; and the ITO slits are at the tip of the "<<" shape.

9. A liquid crystal display panel as claimed in claim 5, wherein the ITO slits are configured on the second pixel electrode at a location corresponding to an edge of the storage electrode.

10. The liquid crystal display panel as claimed in claim 9, wherein the second pixel electrode is a ">>" shaped electrode; and the ITO slits are at the tip of the ">>" shape.

11. The liquid crystal display panel as claimed in claim 9, wherein the second pixel electrode is a "<<" shaped electrode; and the ITO slits are at the tip of the "<<" shape.

12. The liquid crystal display panel as claimed in claim 5, wherein the storage electrode comprises a top storage electrode and a bottom storage electrode; the top storage electrode is above the bottom storage electrode; and the first pixel electrode is above the top storage electrode.

13. A liquid crystal display panel as claimed in claim 12, wherein the ITO slits are configured at a location corresponding to an edge of the top storage electrode.

14. The liquid crystal display panel as claimed in claim 12, wherein the ITO slits are configured at a location corresponding to an edge of the bottom storage electrode.

* * * * *